June 4, 1940.　　　A. P. FERGUESON　　　2,202,903
FENDER SHIELD
Filed Dec. 24, 1938
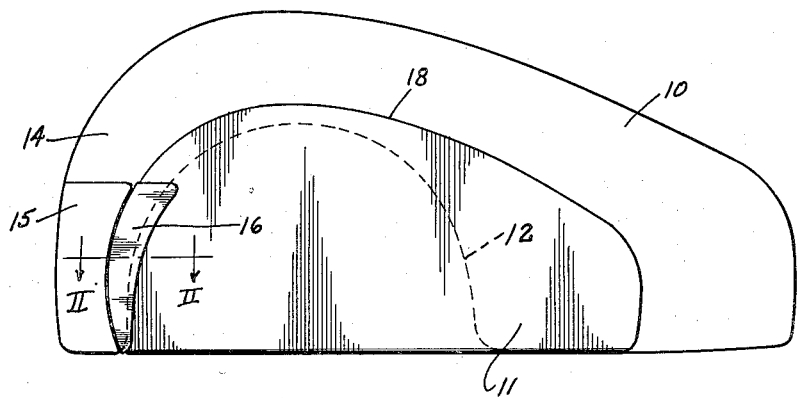
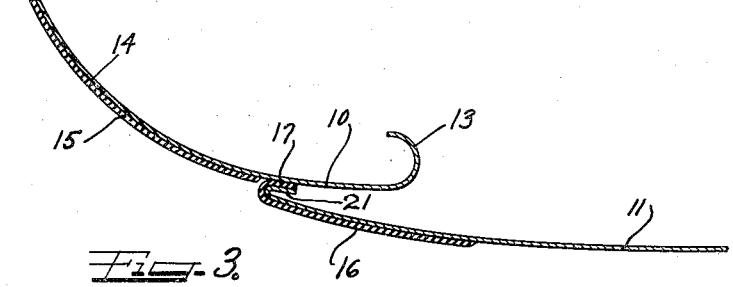
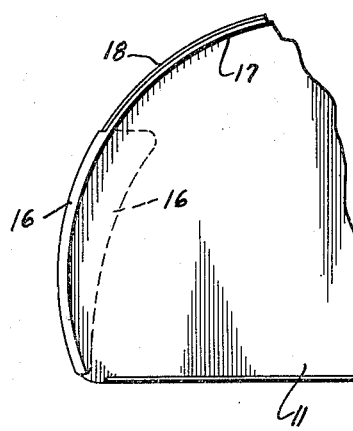
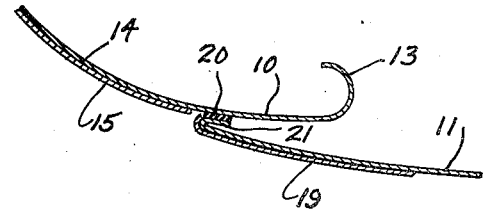
Inventor
ARTHUR P. FERGUESON.

Patented June 4, 1940

2,202,903

UNITED STATES PATENT OFFICE 2,202,903

FENDER SHIELD

Arthur P. Fergueson, Detroit, Mich., assignor to Houdaille-Hershey Corporation, Detroit, Mich., a corporation of Michigan Application December 24, 1938, Serial No. 247,581

3 Claims. (Cl. 280—153)

This invention relates to fender shields, and more particularly to a fender shield having a novel scuff pad and cushioning means thereon.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel.

It is an object of the present invention to provide a fender shield of novel construction and characteristics.

It is a further object of this invention to provide a novel fender shield having a scuff pad along an edge portion thereof.

It is a still further object of this invention to provide a fender shield having a novel combination cushioning strip and scuff pad thereon.

Another and still further object of this invention is to provide an integral scuff pad and cushioning strip for cooperation with a vehicle fender and a vehicle fender shield.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing, in which:

Figure 1 is a front view of a vehicle fender and fender shield assembly, the latter being equipped with a scuff pad;

Figure 2 is an enlarged fragmentary cross-sectional view taken along the line II—II of Figure 1;

Figure 3 is an enlarged fragmentary rear view of the fender shield and scuff pad; and, Figure 4 is a fragmentary sectional view similar to Figure 2 showing a different embodiment of the present invention.

Referring now to Figures 1 to 3 of the drawing, which illustrates the preferred embodiment of my invention, there is illustrated a vehicle fender 10 having a fender shield 11 mounted thereon over the wheel access opening 12 in the outer depending side wall of the fender 10. While the fender 10 may assume a wide variety of shapes without departing from the spirit and scope of the present invention and may indeed be formed integral or made a part of the vehicle body itself (not shown), the fender 10 has been illustrated as being of the usual high crown type commonly employed on motor vehicles of the present day.

The fender shield 11 is detachably mounted on the vehicle fender 10 and is positioned to cover the relatively large opening in the outer side wall of the fender 10 which is conventionally provided in substantially all vehicle fenders to permit access to and removal of the vehicle wheel therethrough. The fender shield 11 may be secured to the fender 10 in any of a wide variety of manners, but since the particular manner in which the fender shield 11 is detachably secured to the fender 10 forms no part of the present invention, the specific mounting means has been omitted from the drawing for purposes of clarity in illustrating the principal features of the present invention.

Merely by way of example and explanation it may be stated that one convenient method for detachably supporting and securing the fender shield 11 to the fender 10 is to provide hook arms at the two lower corners of the fender shield 11 which will extend around the underturned base edges of the fender 10 and then to provide some form of latching means at the top of the fender shield which will extend through the fender opening 12 into engagement with the underturned curved edge 13 of the fender 10.

In many of the newly designed vehicles of the present day the forward or leading surface 14 of the fender 10 is exposed to such an extent that it is subjected to the destructive action of flying stones and other foreign substance from the road surface over which the vehicle is traveling. For that reason, the leading surfaces of such fenders have been equipped with scuff pads 15 or other protective coverings which may be secured thereto in any suitable manner. The scuff pad on the fender 10 may be formed of relatively hard rubber or other semi-yieldable material, or it may be formed of a hard metal which is relatively much harder than the usual form of soft steel which is employed in the manufacture of vehicle fenders.

While the leading edge of the fender shield 11 presents only a relatively small surface which faces in a forward direction, it has nevertheless been found that the leading edge of the fender shield 11 is rapidly damaged when employed on a fender 10 which is subjected to and exposed to flying stones and other foreign matter from the road surface. This has been found to be particularly true where the fender 10 is employed on a vehicle which has had the usual running board entirely or substantially entirely eliminated therefrom. To protect the leading edge of the fender shield 11, a scuff pad 16 is provided to cover and protect it. As is shown in the preferred embodiment of my invention illustrated in Figures 1 and 2 of the drawing, the scuff pad 16 is formed of rubber and is made integral with the cushioning strip 17 which is mounted on the rear face of the fender shield 11 in close proximity to the curved edge 18 thereof. More specifically, the strip 17 is mounted on the inturned edge flange 21 which extends around the curved edge of the fender shield 11.

This combination scuff pad and cushioning strip 16—17 forms a unitary member which may be readily assembled on and secured to the fender shield 11. The particular manner in which the scuff pad 16 and the cushioning strip 17 are held in place on the fender shield 11 forms no part of the present invention, but as will at once be apparent to those skilled in the art, they may be secured in any suitable manner, such as by cementing, riveting or the like. As will further be apparent to those skilled in the art, the cushioning strip 17 is arranged to engage and be held in intimate contact with the outer face of the fender 10 and to prevent a direct metal-to-metal contact between the fender shield 11 and the fender 10, thereby eliminating the usual danger of noise between a metal-to-metal contact. While the scuff pad 16 may be provided with any of a wide variety of shapes and configurations without departing from the spirit and scope of the present invention, it is preferably shaped in the manner as shown in Figure 1 of the drawing.

In Figure 4, I have illustrated a modified form of the present invention wherein a metallic scuff pad 19 is provided and is formed separate from the cushioning strip 20 which extends around the curved edge portion 21 of the fender shield 11. In this instance, the cushioning strip 20 is made of rubber or other suitable cushioning material and the separate scuff pad 19 is formed of a metal which is substantially harder than the metal which is employed in the fender 10.

While I have shown particular embodiments of my invention, it will, of course, be understood, that I do not wish to be limited thereto, since many modifications may be made, and I, therefore, contemplate by the appended claims to cover all such modifications as fall within the true spirit and scope of my invention.

I claim as my invention:

1. As an article of manufacture, a fender shield having a curved edge and including a yieldable cushioning strip adjacent said curved edge and secured to a rear portion of said shield, a scuff pad formed integral with said strip and extending around a portion of said curved edge.

2. As an article of manufacture, a fender shield having a body portion including an outer face and a curved edge, and a scuff pad mounted on said fender shield in proximity to one of its lower corners, said scuff pad extending around said curved edge and over a portion of said outer face, a portion of said scuff pad being arranged to act as a cushioning means between said fender shield and the fender on which it is mounted.

3. A one-piece scuff pad and cushioning strip for fender shield, comprising a scuff pad portion arranged to extend over and around a portion of the edge of the fender shield, and a cushioning strip portion arranged to extend along substantially the entire edge of the fender shield which engages a vehicle fender.

ARTHUR P. FERGUESON.